(12) United States Patent
Kim

(10) Patent No.: US 7,906,782 B2
(45) Date of Patent: Mar. 15, 2011

(54) LIQUID CRYSTAL DISPLAY DEVICE

(75) Inventor: Dong-Young Kim, Gyeongbuk (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/591,502

(22) Filed: Nov. 20, 2009

(65) Prior Publication Data

US 2010/0072477 A1    Mar. 25, 2010

Related U.S. Application Data

(62) Division of application No. 11/638,382, filed on Dec. 14, 2006, now Pat. No. 7,642,111.

(30) Foreign Application Priority Data

May 9, 2006 (KR) .............................. 2006-0041601

(51) Int. Cl.
*H01L 29/04* (2006.01)
(52) U.S. Cl. .................................. 257/59; 257/E33.064
(58) Field of Classification Search .................... 257/57, 257/59, 72, 83, 257, 290, 351, 368, 392, 257/E33.064
See application file for complete search history.

(56) References Cited

U.S. PATENT DOCUMENTS 6,100,953 A    8/2000  Kim et al.
7,206,042 B2 *  4/2007  Yang et al. .................... 349/106

FOREIGN PATENT DOCUMENTS

JP    8-22023 A    1/1996

\* cited by examiner

*Primary Examiner* — Quoc D Hoang
(74) *Attorney, Agent, or Firm* — McKenna Long & Aldridge LLP

(57) ABSTRACT

A liquid crystal display device includes a first substrate and a second substrate facing each other having a pixel region; a color filter layer on the first substrate corresponding to the pixel region; a planarization layer on the color filter layer having a groove; a common electrode on the planarization layer; a pixel electrode on the second substrate; and a liquid crystal layer between the common electrode and the pixel electrode.

12 Claims, 9 Drawing Sheets

LIQUID CRYSTAL DISPLAY DEVICE

This Application is a Divisional Application of U.S. patent application Ser. No. 11/638,382, filed on Dec. 14, 2006, now U.S. Pat. No. 7,642,111 which claims the benefit of Korean Patent Application No. 2006-041601, filed on May 9, 2006, all of which are hereby incorporated by reference for all purposes as if fully set forth herein.

BACKGROUND OF THE INVENTION

1. Field of the Invention

The present invention relates to a liquid crystal display device.

2. Discussion of the Related Art

Until recently, display devices have typically used cathode-ray tubes (CRTs). Presently, much effort has been expended to develop various types of flat panel displays, such as liquid crystal display (LCD) devices, plasma display panels (PDPs), field emission displays, and electro-luminescence displays (ELDs), as substitutes for CRTs. Of these types of flat panel displays types, LCD devices have many advantages, such as high resolution, light weight, thin profile, compact size, and low power requirements.

In general, an LCD device includes two substrates that are spaced apart and facing each other with a liquid crystal layer interposed between the two substrates. The two substrates include electrodes that face each other such that a voltage applied between the electrodes induces an electric field across the liquid crystal layer. Alignment of the liquid crystal molecules in the liquid crystal layer changes in accordance with the intensity of the induced electric field to align with the direction of the induced electric field, thereby changing the light transmissivity of the LCD device. Thus, the LCD device displays images by varying the intensity of the induced electric field in respective pixel regions that make up the LCD device. Presently, a wide viewing angle is needed for LCD devices. A vertical alignment (VA) mode LCD device has these characteristics. The VA mode LCD device uses liquid crystal molecules having negative dielectric anisotropy and an alignment layer rubbed vertically.

FIG. 1 is a cross-sectional view illustrating a VA mode LCD device according to the related art, and FIG. 2 is a cross-sectional view illustrating alignment of liquid crystal molecules of FIG. 1.

Referring to FIG. 1, a VA mode LCD device 60 includes an array substrate B1, a color filter substrate B2, and a liquid crystal layer 14 between the two substrates.

The array substrate B1 includes gate and data lines (not shown) that cross each other to define a pixel region P and a thin film transistor T that is connected to the gate and data lines, on a first substrate 32. The thin film transistor T includes a gate electrode 30, a semiconductor layer 34, and source and drain electrodes 36 and 38. A pixel electrode 46 is disposed in the pixel region P and connected to the drain electrode 38. A gate insulating layer 32 is disposed on the gate electrode 30. A passivation layer 40 is disposed on the source and drain electrodes 36 and 38.

The color filter substrate B2 includes a black matrix 52 and a color filter layer on a second substrate 50. The color filter layer includes red (R), green (G) and blue (B) color filter patterns 54a, 54b and 54c in the corresponding pixel regions P. A common electrode 56 is disposed on the color filter layer. A rib 58 is disposed on the common electrode 56. The wide viewing angle is achieved using the rib 58.

Referring to FIG. 2, when an electric field is induced by the voltages applied to the pixel and common electrodes 46 and 56, the electric field near the rib 58 is distorted due to the rib 58. The distorted electric field is symmetrical with respect to the rib 58. The liquid crystal molecules 70 are also arranged symmetrically with respect to the rib 58, and first and second domains D1 and D2 are formed symmetrically with respect to the rib 58. Accordingly, light passing through the first and second domains D1 and D2 are compensated, thus color shift is reduced, and viewing angle is widened.

FIGS. 3A and 3B are cross-sectional views illustrating a method of fabricating the color filter substrate of FIG. 1.

Referring to FIG. 3A, a black matrix 52 is formed on a substrate 50 with a mask process. The black matrix 52 has an opening corresponding to a pixel region P. Red, green and blue color filter patterns 54a, 54b and 54c are formed in the corresponding pixel regions P with the corresponding mask processes.

Referring to FIG. 3B, a common electrode 56 is formed on the color filter patterns 54a, 54b and 54c. A rib 58 is formed on the common electrode 56 with a mask process.

Through the above processes, the color filter substrate is fabricated using five masks for the black matrix, the red, green and blue color filter patterns, and the rib.

Because the common electrode is formed directly on the color filter patterns, the common electrode has step portions reflecting step portions of the color filter patterns. Accordingly, when an alignment layer (not shown) is formed on the common electrode and rubbed, defects are caused near the step portions. Further, a cell gap between the array substrate and the color filter substrate is not uniform due to the step portions, and thus a margin of filling the liquid crystal between the two substrates is difficult to ensure.

Further, the common electrode is made of indium-tin-oxide having an amorphous state and has a thickness of angstroms. Accordingly, pigments of the color filter patterns may flow out through the common electrode 56, and thus the liquid crystal is contaminated by the pigments that flow out.

SUMMARY OF THE INVENTION

Accordingly, the present invention is directed to a liquid crystal display device that substantially obviates one or more of problems due to limitations and disadvantages of the related art.

An advantage of the present invention is to provide for the proper filling of a liquid crystal display device with liquid crystal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a first substrate and a second substrate facing each other having a pixel region; a color filter layer on the first substrate corresponding to the pixel region; a planarization layer on the color filter layer having a groove; a common electrode on the planarization layer; a pixel electrode on the second substrate; and a liquid crystal layer between the common electrode and the pixel electrode.

In another aspect, a method of fabricating a liquid crystal display device includes forming a color filter layer on a first substrate corresponding to a pixel region; forming a planarization layer on the color filter layer having a groove;

forming a common electrode on the planarization layer; forming a pixel electrode on a second substrate; and attaching the first and second substrate, wherein a liquid crystal layer is interposed between the common electrode and the pixel electrode.

In another aspect, a liquid crystal display device includes a first substrate and a second substrate facing each other having a pixel region; a color filter layer on the first substrate and corresponding to the pixel region, the color filter layer having a step portion; a planarization layer directly on the color filter layer having a groove; a common electrode on the planarization layer; a pixel electrode on the second substrate; and a liquid crystal layer between the common electrode and the pixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the embodiments of the present invention, examples of which are illustrated in the accompanying drawings.

Figure 1:
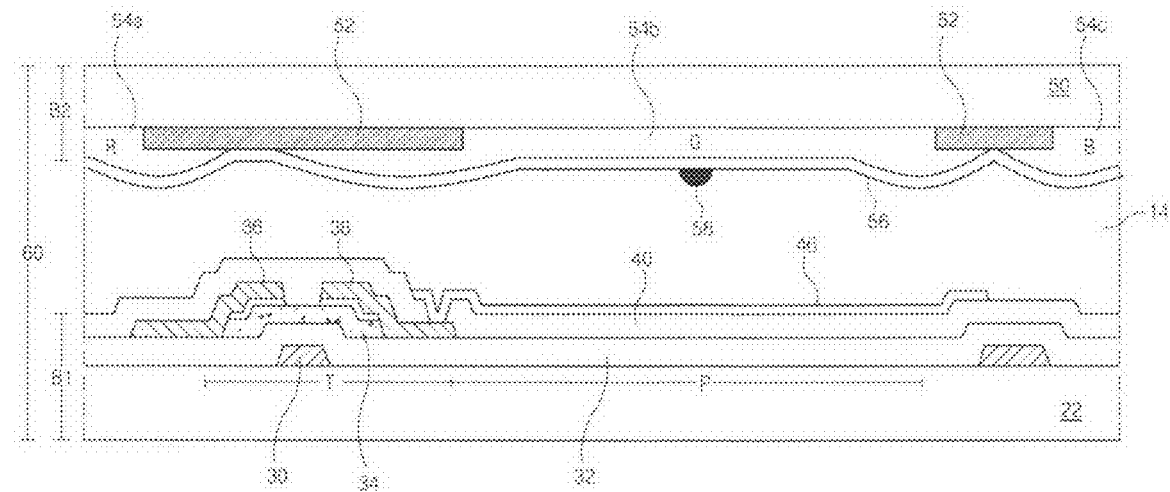
FIG. 1 is a cross-sectional view illustrating a VA mode LCD device according to the related art.
Figure 2:
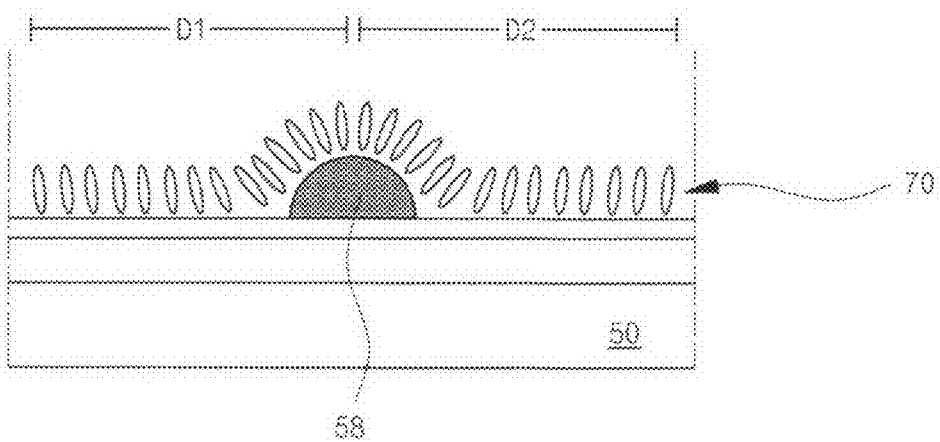
FIG. 2 is a cross-sectional view illustrating alignment of liquid crystal molecules of FIG. 1.
Figure 3A:
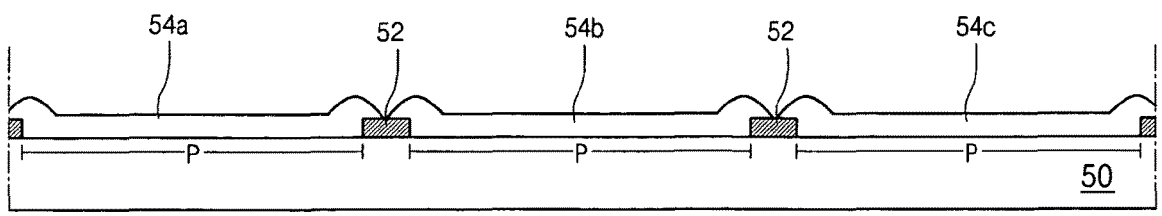
FIGS. 3A and 3B are cross-sectional views illustrating a method of fabricating the color filter substrate of FIG. 1.
Figure 3B:
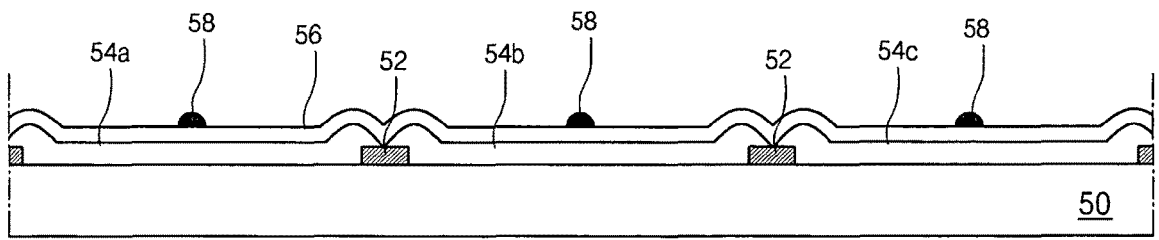
Figure 4:
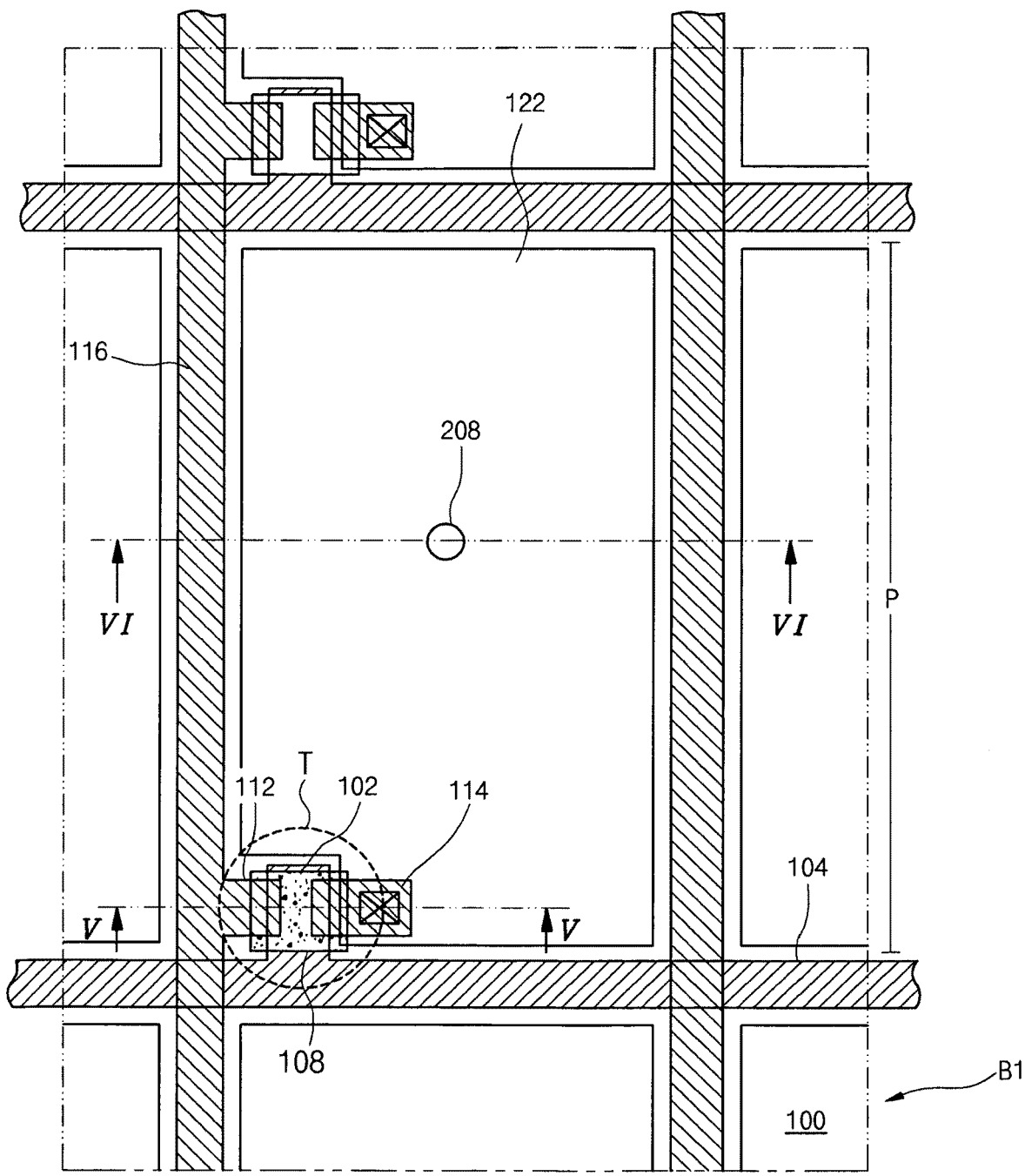
FIG. 4 is a plan view illustrating a VA mode LCD device according to an exemplary embodiment of the present invention.

FIG. 4 is a plan view illustrating a VA mode LCD device according to an exemplary embodiment of the present invention.

As illustrated in FIG. 4, an array substrate B1 of the VA mode LCD device includes a gate line 104 and a data line 116 crossing each other to define a pixel region P and a thin film transistor T connected to the gate and data lines 104 and 116 on a substrate 100.

The thin film transistor T includes a gate electrode 102, a semiconductor layer 108, and source and drain electrodes 112 and 114. A pixel electrode 122 is connected to the drain electrode 114.

A color filter substrate facing the array substrate B1 includes at least one groove 208 in the pixel region P. The groove 208 is formed in a planarization layer. By forming the groove 208, liquid crystal molecules are arranged symmetrically with respect to the groove 208. The groove 208 may have a circular shape in a horizontal plane.

Figure 5:
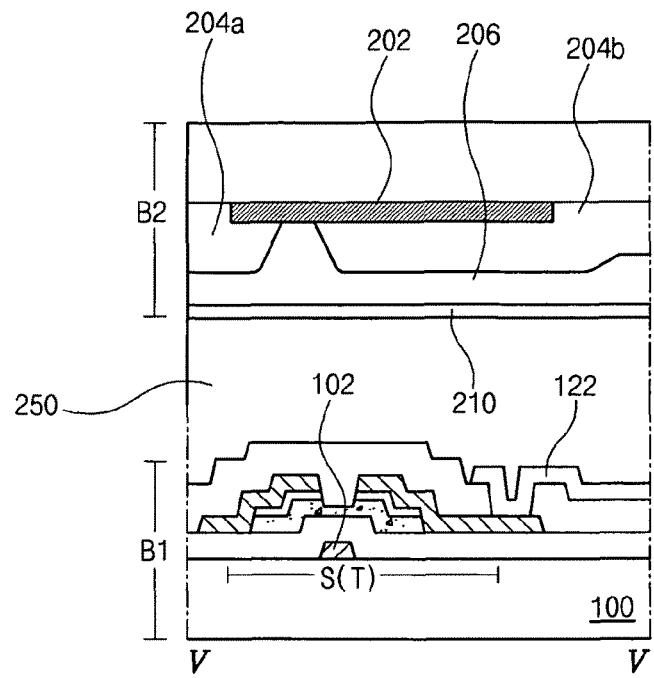
FIGS. 5 and 6 are cross-sectional views taken along lines V-V and VI-VI of FIG. 4, respectively
Figure 6:
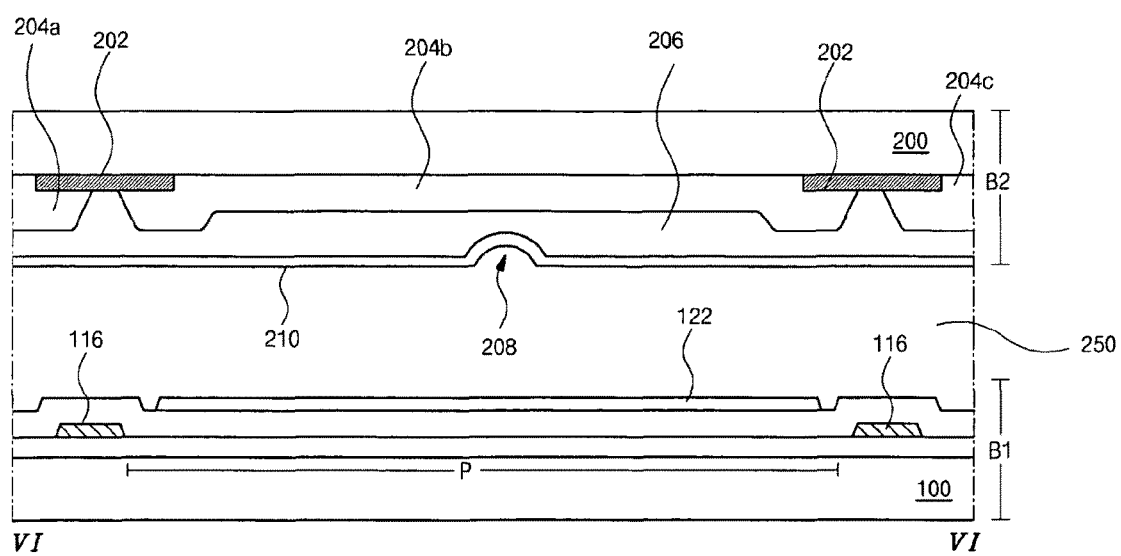

FIGS. 5 and 6 are cross-sectional views taken along lines V-V and VI-VI of FIG. 4, respectively.

Referring to FIGS. 5 and 6, an array substrate B1 and a color filter substrate B2 face each other, and a liquid crystal layer 250 is interposed between the array substrate B1 and the color filter substrate B2.

A data line 116 crosses a gate line (104 of FIG. 4) to define a pixel region P on a first substrate 100. A thin film transistor T is in a switching region S. A pixel electrode 122 is in the pixel region P.

A black matrix 202 is on a second substrate 200. The black matrix 202 has an opening corresponding to the pixel region P. The black matrix 202 corresponds to the gate line, the data line 116 and the thin film transistor T. A color filter layer includes red, green and blue color filter patterns 204a, 204b and 204c corresponding to the respective pixel regions P.

A planarization layer 206 is on the color filter layer to planarize the color filter substrate B2 having the color filter layer. The planarization layer 206 includes a groove 208. An upper surface of the planarization layer 206 is substantially even except for portions where the groove 208 is formed.

A common electrode 210 is on the planarization layer 206. Because the planarization layer 206 is formed on the color filter layer, the common electrode 210 is substantially even except for portions where the groove 208 is formed.

When an electric field is induced between the pixel and common electrodes 122 and 210, the electric field near the groove 208 is distorted with respect to the groove 208. Accordingly, the electric field is produced symmetrically with respect to the groove 208.

Figure 7:
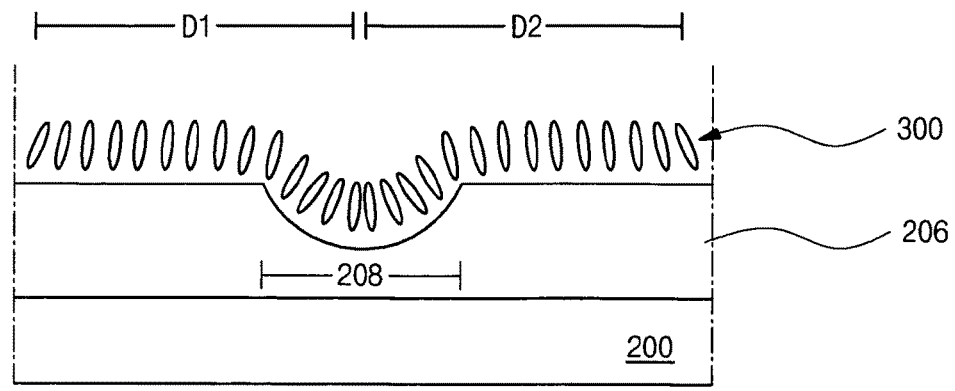
FIG. 7 is a cross-sectional view illustrating alignment of liquid crystal molecules according to the exemplary embodiment of the present invention.

FIG. 7 is a cross-sectional view illustrating alignment of liquid crystal molecules according to the exemplary embodiment of the present invention. In FIG. 7, a planarization layer 206 is shown on a substrate 200.

Referring to FIG. 7, when an electric field is induced, the electric field near the groove 208 is distorted due to the groove 208. The electric field is symmetrical with respect to the groove 208. The liquid crystal molecules 300 are also arranged symmetrically with respect to the groove 208, and symmetrical first and second domains D1 and D2 are formed with respect to the groove 208. Accordingly, light passing through the first and second domains D1 and D2 are compensated, thus color shift can be reduced and viewing angle can be widened, as similar to the related art using the rib.

Further, because the planarization layer 206 having the groove 208 is formed on the color filter layer, flowing out of pigments of the color filter layer can be prevented.

Further, because the color filter substrate substantially has an even surface, a cell gap is substantially uniform, and a margin of filling the liquid crystal between the two substrates can be ensured. Further, when an alignment layer is formed on the common electrode and rubbed, defects caused due to step portions can be prevented.

Figure 8A:
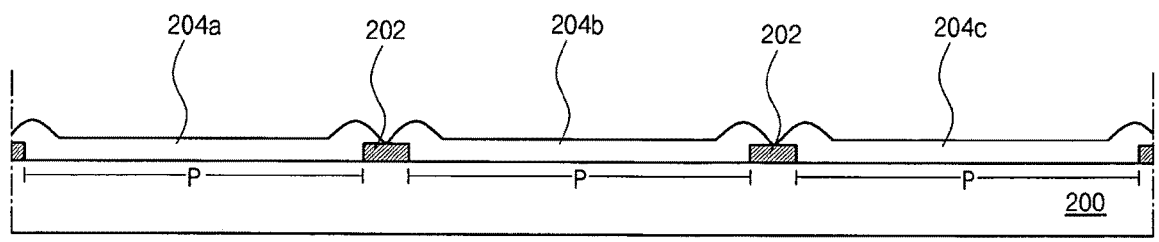
FIGS. 8A to 8D are cross-sectional views illustrating a method of fabricating a color filter substrate according to the exemplary embodiment of the present invention.
Figure 8B:
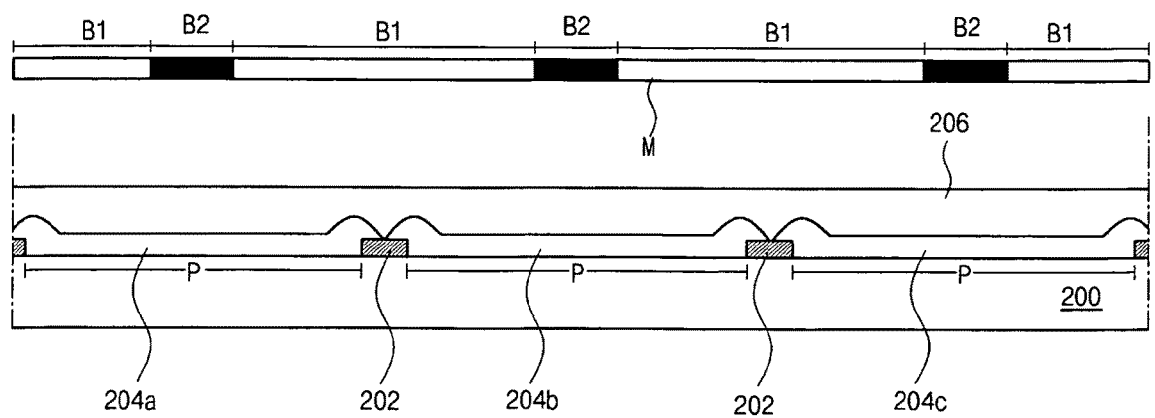
Figure 8C:
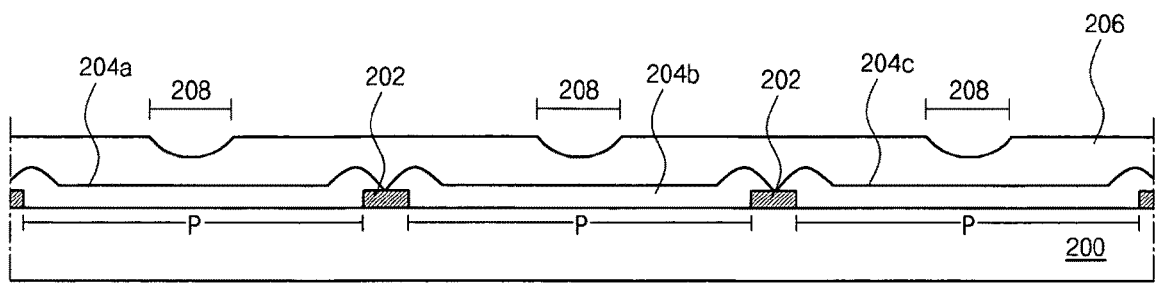

FIGS. 8A to 8C are cross-sectional views illustrating a method of fabricating a color filter substrate according to the exemplary embodiment of the present invention.

Referring to FIG. 8A, a black matrix 202 is formed on a substrate 200 with a mask process. The black matrix 202 may include chromium/chromium oxide (Cr/CrO$_2$). The black matrix 202 corresponds to a gate line (104 of FIG. 4), a data line (116 of FIG. 4) and a thin film transistor (T of FIG. 4).

Red, green and blue color filter patterns 204a, 204b and 204c are sequentially formed on the substrate 200 having the black matrix 202 using mask processes. For example, a red color resin is coated on the substrate 200 and patterned to form the red color filter pattern 204a in a corresponding pixel region P. In a similar manner, the green and blue color filter patterns 204b and 204c are formed in the corresponding pixel regions P. The color filter patterns 204a, 204b and 204c may overlap the black matrix 202.

Referring to FIG. 8B, a planarization layer 206 is formed on the color filter patterns 204a, 204b and 204c. The planarization layer 206 may include a photo-sensitive organic material such as a photo-acrylic resin. For example, a negative type photo-sensitive organic material may be used. A mask M is disposed over the planarization layer 206. The mask M has a transmitting portion B1 and a blocking portion B2. The blocking portion B2 is disposed where a groove is to be formed. The blocking portion B2 may have a circular shape in a horizontal plane.

Light-exposure process is performed with the mask M, thus portions of the planarization layer 206 corresponding to the transmitting portion B1 is exposed to light and the other portions corresponding to the blocking portion B2 is not exposed to light. When the planarization layer 206 is made of the negative type photo-sensitive organic material, the portions exposed to light remain, and the other portions not exposed to light are developed and removed. Accordingly, the other portions not exposed to light are removed by a developing process. The amount (thickness) developed may be adjusted according to the developing time. For example, by adjusting the developing time, the other portions corresponding to the blocking portion B2 are partially removed. Accordingly, referring to FIG. 8C, a groove 208 is formed. The groove 208 may has a semi-circular shape in a vertical cross-section.

Figure 8D:
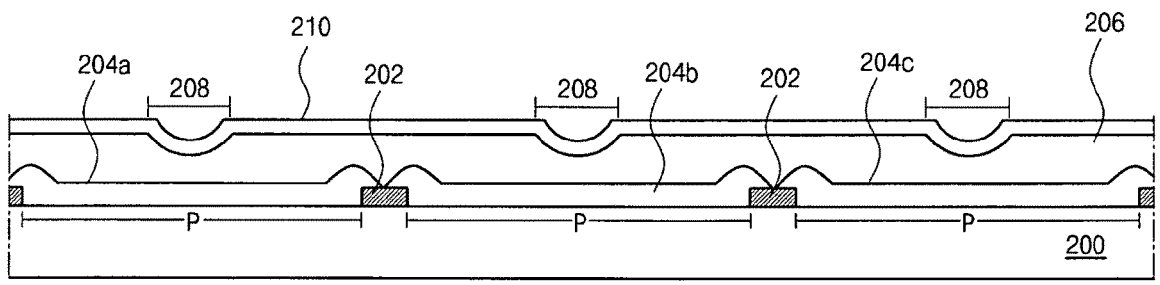

Referring to FIG. 8D, a common electrode 210 is formed on the planarization layer 206. The common electrode 210 may include a transparent conductive material such as indium-tin-oxide (ITO), indium-zinc-oxide (IZO) and indium-tin-zinc-oxide (ITZO). Although not shown in the drawings, an alignment layer is formed on the common electrode 210 and rubbed.

Through the above processes, the color filter substrate is fabricated using five masks for the black matrix, the red, green and blue color filter patterns and the groove. Even when the color filter substrate is fabricated using the same masks as those of the related art, advantages, as explained above, may be obtained.

FIGS. 9A to 9E and 10A to 10E are cross-sectional views, taken along lines V-V and VI-VI of FIG. 4, illustrating a method of fabricating an array substrate according to the exemplary embodiment of the present invention.

Figure 9A:
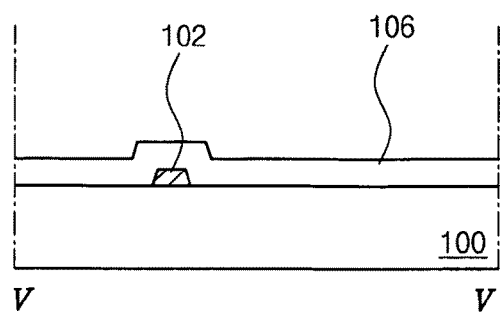
FIGS. 9A to 9E and 10A to 10E are cross-sectional views, taken along lines V-V and VI-VI of FIG. 4, illustrating a method of fabricating an array substrate according to the exemplary embodiment of the present invention.
Figure 10A:
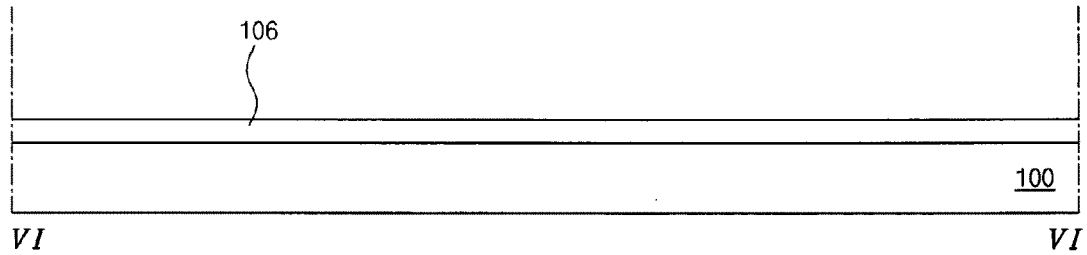

Referring to FIGS. 9A and 10A, a conductive material is deposited on a substrate 100 and patterned with a mask to form a gate electrode 102 and a gate line (104 of FIG. 4). The conductive material may include chromium (Cr), molybdenum (Mo), tungsten (W), aluminum (Al), aluminum alloy (AlNd), copper (Cu) and titanium (Ti). A gate insulating layer 106 is formed on the substrate 100 having the gate electrode 102.

Figure 9B:
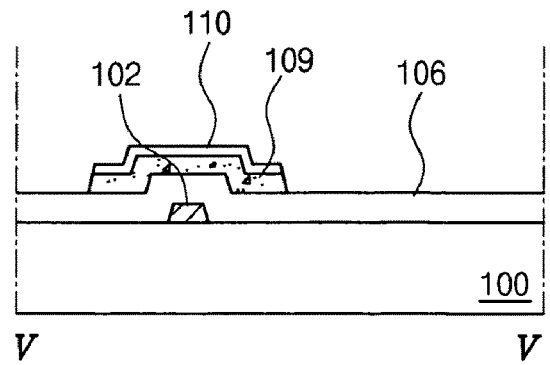
Figure 10B:
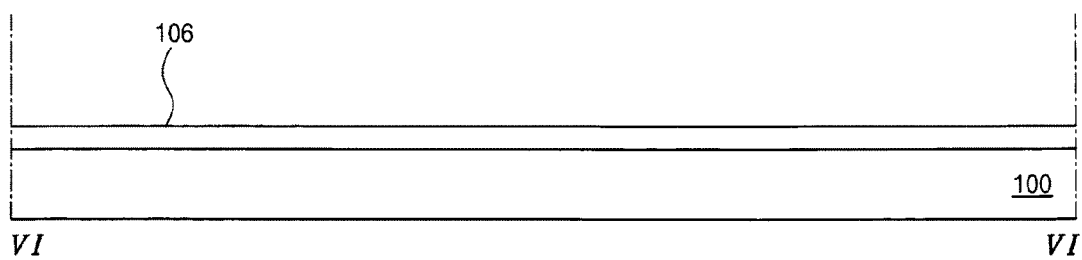

Referring to FIGS. 9B and 10B, an intrinsic amorphous silicon layer and an impurity-doped silicon layer are sequentially formed on the gate insulating layer 106 and patterned with a mask to form an active layer 109 and an ohmic contact layer 110. The active layer 109 and the ohmic contact layer 110 forms a semiconductor layer (108 of FIG. 4).

Figure 9C:
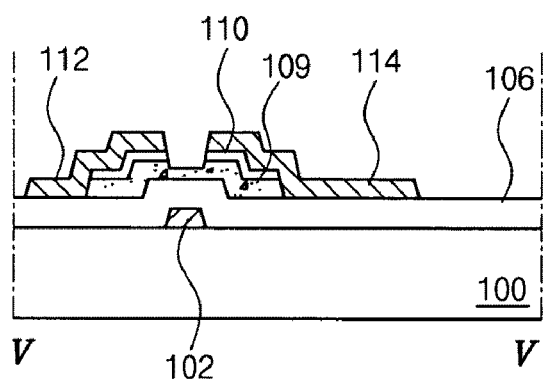
Figure 10C:
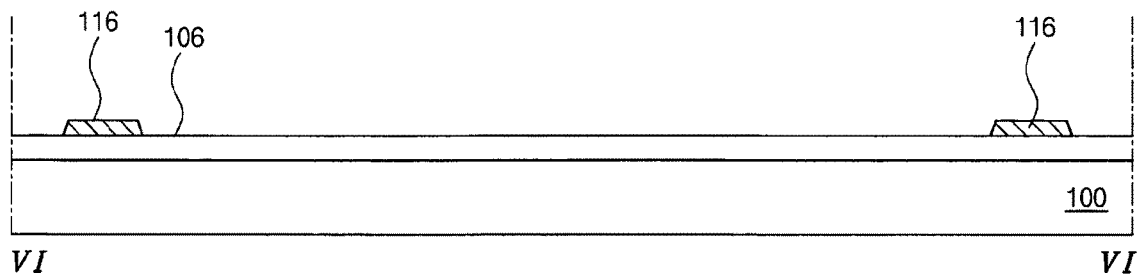

Referring to FIGS. 9C and 10C, a conductive material is deposited on the substrate 100 having the semiconductor layer and patterned with a mask to form a data line 116 and source and drain electrodes 112 and 114. The conductive material may include chromium (Cr), molybdenum (Mo), tungsten (W), aluminum (Al), aluminum alloy (AlNd), copper (Cu) and titanium (Ti). The data line 116 crosses the gate line to define a pixel region.

Figure 9D:
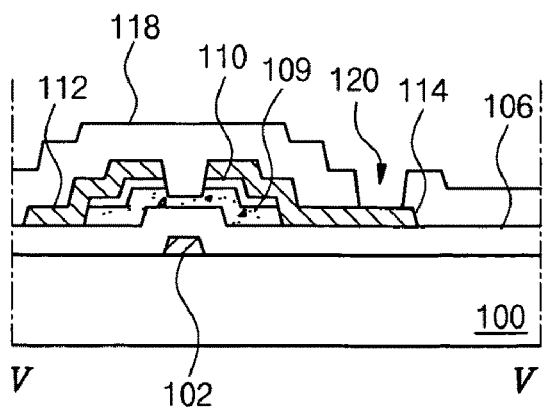
Figure 10D:
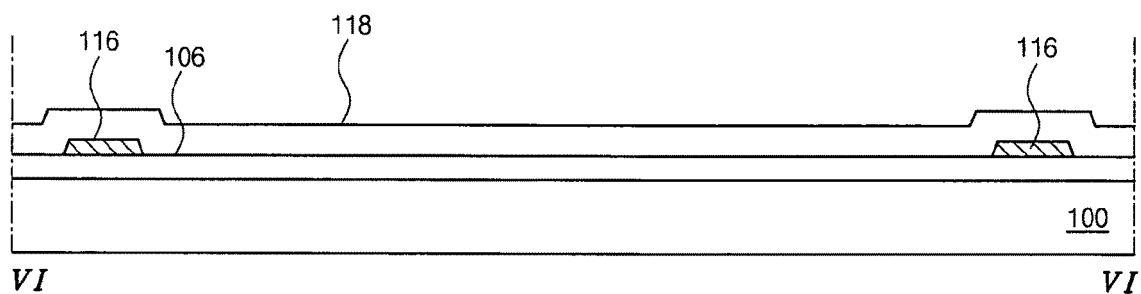

Referring to FIGS. 9D and 10D, an organic insulating material is deposited on the substrate 100 having the data line 116 to form the passivation layer 118. The organic insulating material may include benzocyclobutene (BCB) and acrylic resin. The passivation layer 118 is patterned with a mask to form a drain contact hole 120 exposing the drain electrode 114.

Figure 9E:
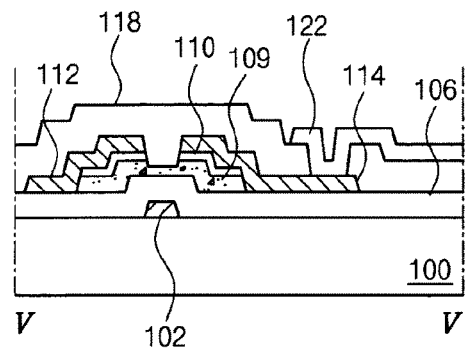
Figure 10E:
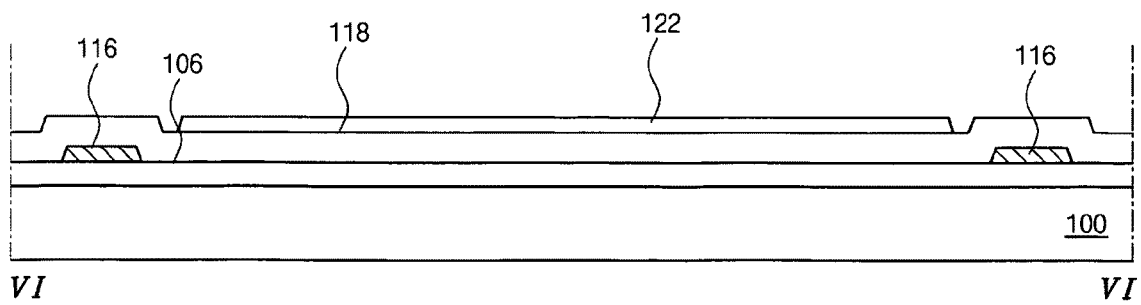

Referring to FIGS. 9E and 10E, a transparent conductive material is deposited on the passivation layer 118 and patterned with a mask to form a pixel electrode 122. The transparent conductive material may include indium-tin-oxide (ITO), indium-zinc-oxide (IZO) and indium-tin-zinc-oxide (ITZO). The pixel electrode 122 is formed in the pixel region. Although not shown in the drawings, an alignment layer is formed on the substrate 100 having the pixel electrode 122 and rubbed.

Through the above processes, the array substrate is fabricated.

As explained above, the planarization layer is formed on the color filter layer and has the groove distorting the electric field. Accordingly, flowing out of the pigments in the color filter layer may be prevented. Further, a cell gap is substantially uniform and the volume of the liquid crystal between the two substrates may be ensured. Further, when an alignment layer is formed on the common electrode and rubbed, defects caused due to step portions may be prevented.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
a first substrate and a second substrate facing each other having a pixel region;
a color filter layer on the first substrate corresponding to the pixel region;
a planarization layer on the color filter layer and having a first groove;
a common electrode on the planarization layer and having a second groove corresponding to the first groove;
a pixel electrode on the second substrate; and
a liquid crystal layer between the common electrode and the pixel electrode.

2. The device according to claim 1, wherein the planarization layer directly contacts the color filter layer.

3. The device according to claim 1, wherein the groove has a circular shape in a horizontal plane.

4. The device according to claim 1, wherein the groove has a semi-circular shape in a vertical cross-section.

5. The device according to claim 1, further including a black matrix between adjacent pixel regions.

6. The device according to claim 5, wherein the color filter layer overlaps the black matrix and has a step portion at an overlapped position.

7. The device according to claim 6, wherein an upper surface of the planarization layer is substantially even except for an area where the groove is disposed.

8. The device according to claim 1, further including gate and data lines crossing each other and a thin film transistor connected to the gate and data lines and the pixel electrode on the second substrate.

9. A liquid crystal display device, comprising:
- a first substrate and a second substrate facing each other having a pixel region;
- a color filter layer on the first substrate and corresponding to the pixel region, the color filter layer having a step portion;
- a planarization layer directly on the color filter layer and having a first groove;
- a common electrode on the planarization layer and having a second groove corresponding to the first groove;
- a pixel electrode on the second substrate; and
- a liquid crystal layer between the common electrode and the pixel electrode.

10. The device according to claim 9, wherein an upper surface of the planarization layer is substantially even except for a position where the groove is disposed.

11. The device according to claim 9, wherein the groove has a circular shape in a horizontal plane.

12. The device according to claim 9, wherein the groove has a semi-circular shape in a vertical cross-section.

* * * * *